United States Patent
Fouilland et al.

(10) Patent No.: US 9,140,800 B2
(45) Date of Patent: Sep. 22, 2015

(54) METHOD FOR ACQUIRING A SATELLITE RADIO NAVIGATION SIGNAL AND SATELLITE RADIO NAVIGATION RECEIVER APPLYING THIS METHOD

(71) Applicant: THALES, Neuilly sur Seine (FR)

(72) Inventors: Bernard Fouilland, Fauconnieres (FR); Patrick Vieux, Saint-Peray (FR)

(73) Assignee: Thales, Neuilly sur Seine (FR)

( * ) Notice: Subject to any disclaimer, the term of this patent is extended or adjusted under 35 U.S.C. 154(b) by 0 days.

(21) Appl. No.: 14/494,021

(22) Filed: Sep. 23, 2014

(65) Prior Publication Data

US 2015/0085900 A1  Mar. 26, 2015

(30) Foreign Application Priority Data

Sep. 24, 2013 (FR) ...................... 13 02219

(51) Int. Cl.
*H04B 1/00* (2006.01)
*G01S 19/30* (2010.01)
*G01S 19/22* (2010.01)
*H04B 1/709* (2011.01)
*H04B 1/7097* (2011.01)

(52) U.S. Cl.
CPC ................. *G01S 19/30* (2013.01); *G01S 19/22* (2013.01); *H04B 1/709* (2013.01); *H04B 1/7097* (2013.01)

(58) Field of Classification Search
CPC ............................ H04B 1/7115; H04B 1/7117
USPC ................. 375/148, 150; 342/357.25, 357.59
See application file for complete search history.

(56) References Cited

U.S. PATENT DOCUMENTS

| | | |
|---|---|---|
| 5,850,420 A | 12/1998 | Guillard et al. |
| 2006/0215739 A1 | 9/2006 | Williamson et al. |
| 2011/0309978 A1* | 12/2011 | Matsumoto .............. 342/357.77 |
| 2012/0281735 A1 | 11/2012 | Martin et al. |

FOREIGN PATENT DOCUMENTS

| | | |
|---|---|---|
| DE | 10 2006 001794 | 7/2007 |
| FR | 2 739 695 | 4/1997 |
| FR | 2 974 914 | 11/2012 |
| FR | 2 984 524 | 6/2013 |

OTHER PUBLICATIONS

Danai Skournetou et al: "Non-coherent multiple correlator delay structures and their tracking performance for Galileo signals"; May 1, 2007, extract from the internet: http://citeseerx.ist.psu.edu/viewdoc/download?doi=10.1.1.77.2140&rep=rep1&type=pdf.

* cited by examiner

*Primary Examiner* — Khai Tran
(74) *Attorney, Agent, or Firm* — Davidson, Davidson and Kappel LLC

(57) ABSTRACT

This acquisition method is provided for acquiring a satellite signal emitted by a radio navigation satellite, the satellite signal containing a cyclic pseudo-random identification code specific to the satellite. The acquisition method includes the generation of a local code producing a replica of the identification code, and the production of a combined correlation (EDDC) of a received signal with the local code, the combined correlation corresponding to the linear combination of a first double delta correlation and of a second narrow correlation.

20 Claims, 3 Drawing Sheets

METHOD FOR ACQUIRING A SATELLITE RADIO NAVIGATION SIGNAL AND SATELLITE RADIO NAVIGATION RECEIVER APPLYING THIS METHOD

This claims the benefit of French Patent Application ER 13 02219, filed Sep. 24, 2013 and hereby incorporated by reference herein.

The present invention relates to the field of receiving satellite radio navigation signals.

BACKGROUND

A satellite navigation system allows a user to determine his/her geographical position in three dimensions (longitude, latitude and altitude), his/her speed and the time. Satellite navigation systems are known under the names of GPS, GALILEO or GLONASS.

Such a satellite navigation system comprises a constellation of satellites in orbit. Each satellite emits a satellite signal consisting of a carrier with a determined frequency, modulated by a navigation message and an identification code called « pseudo-random code ». The navigation message notably contains data on the ephemeris of the satellite. The pseudo-random code is a pseudo-random cyclic binary signal specific to the satellite. Each satellite has its own pseudo-random code and its own carrier frequency. The pseudo-random code spreads out the satellite signal over a wide frequency band and embeds the satellite signal in the background noise. This limits the interferences between the satellite signals and the sensitivity to external perturbations.

In order to detect a satellite signal, the receiver generates a local code by means of a code generator driven by a digitally controlled oscillator, the local code reproducing the pseudo-random code of the satellite signal, and correlates the received signal with the local code.

In an initial acquisition phase, in which the receiver tries to detect the satellite signal, it is necessary to synchronize the locally generated local code with the received pseudo-random code of the satellite. To do this, the receiver comprises a code loop (or DLL, "Delay Lock Loop") for subordinating the code oscillator. The code loop comprises a suitable code discriminator for receiving the result of the correlation, in order to determine a code error depending on the result of the correlation and for sending a corresponding code correction signal to the code oscillator.

The satellite navigation receiver receives the satellite signal in a direct line-of-sight and optionally, depending on the environment, in an indirect line-of-sight, for example after reflection on the ground, the sea or on buildings. These multiple paths perturb the detection of the satellite signal and are sources of error in calculating the positioning of the receiver.

To overcome this drawback, in the acquisition phase it is known to correlate the satellite signal with a combination of punctual, advanced and/or delayed local codes, so as to obtain a correlation function with which the pseudo-random code received in direct line-of-sight may be better discriminated.

FR 2 739 695 discloses a Double Delta correlator which will be described in more detail hereafter. The theoretical correlation function of the Double Delta correlator has a narrow capture area surrounded by two so-called « false lock-on » areas, in which the correlation coefficient is zero.

The Double Delta correlator is efficient for an initial code error located in the capture area. Nevertheless, if the initial code error is located in a false lock-on area, the code loop operates in an open loop, which leads to a stationary measurement error.

Further, in a practical embodiment, the band pass of the receiver is not infinite so that the actual correlation function has secondary zeros in the false lock-on areas, over which the code loop may be locked on.

In order to overcome this drawback, FR 2 974 914 proposes a receiver comprising a Double Delta correlator associated with a false lock-on detector.

Nevertheless, this requires adaptation of the receiver for implementing the false lock-on detector, which is not necessarily possible upon updating a receiver.

SUMMARY OF THE INVENTION

It is an object of the present invention to provide a method for receiving satellite navigation signals which are not very sensitive to false lock-ons.

The present invention provides method for acquiring a satellite signal emitted by a radio navigation satellite, the satellite signal containing a cyclic pseudo-random identification code specific to the satellite, the acquisition method comprising the generation of a local code as a replica of the identification code, and producing a combined correlation of a received signal with a local code, the combined correlation corresponding to the linear combination of a first Double Delta correlation and a second narrow correlation.

The method optionally comprises one or several of the following features, taken alone or according to all the technically possible combinations:

the first Double Delta correlation is produced by correlation of the received signal with an arithmetic combination of two advanced local codes and of two delayed codes obtained by a time shift of the local point code with delays −2d, −d, d and 2d, wherein d is a delay increment, and respectively assigned to the coefficients 1, −2, +2 and −1;

the second narrow correlation is based on the difference between an advanced code with the delay −D relatively to the local code and a local code delayed by the delay D relatively to the local point code;

the increment delay d of the first double delta correlation is equal to the delay increment D of the second narrow correlation;

the linear combination is produced by assigning the first double delta correlation and the second narrow correlation of positive coefficients with a sum equal to 1;

the linear combination is obtained by alternating the first correlation on a first fraction of a time cycle and the second correlation of a second fraction of the time cycle complementary of the first fraction, in a cyclic manner;

the linear combination is obtained by correlation and calculation from advanced and delayed local codes;

the acquisition method comprises the synchronization of the local code with the identification code so as to minimize a determined code error depending on the result of the combined correlation;

the local code is generated by means of a local code generator driven by a code oscillator subordinated by a code loop to the result of the combined correlation.

The invention also relates to a satellite radio navigation receiver, for receiving a satellite signal containing a cyclic pseudo random identification code specific to the satellite, the receiver comprising a code generator and a correlation module for applying an acquisition method as defined above.

BRIEF DESCRIPTION OF THE DRAWINGS

The invention and advantages thereof will be better understood upon reading the description which follows, only given as an example and made with reference to the appended drawings, wherein.

DETAILED DESCRIPTION

Figure 1:
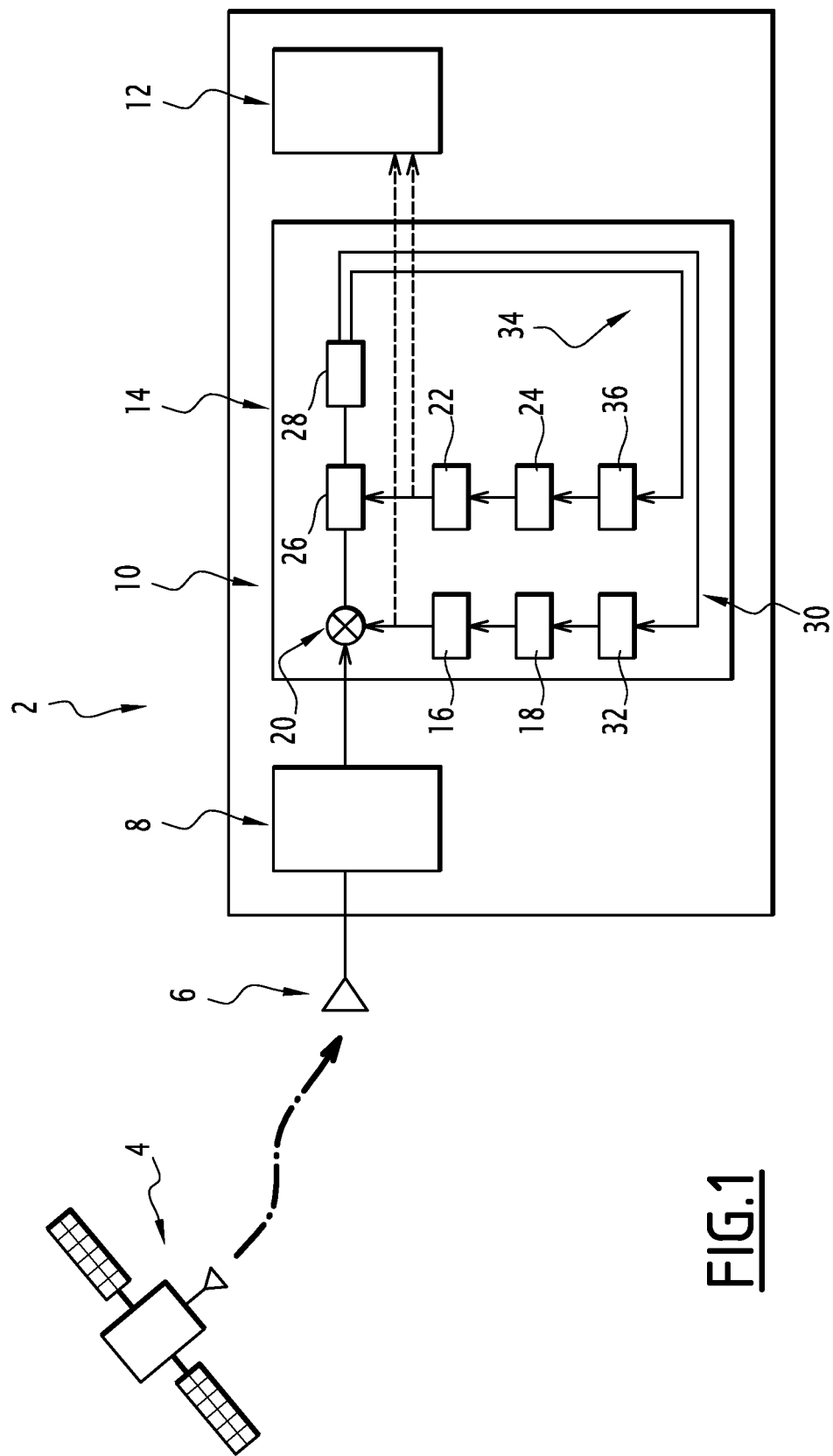
FIG. 1 is a functional diagram of a satellite navigation receiver.

The satellite navigation receiver 2 illustrated in FIG. 1 is able to determine its geographical position, its speed and time, from satellite signals emitted by satellites of a satellite navigation system and received by the receiver 2.

A satellite 4 is illustrated in FIG. 1. In practice, the satellite navigation system comprises a constellation of satellites. The satellite signals of four different satellites are required for determining the geographical position.

The receiver 2 comprises an antenna 6, a conditioning stage 8, a receiving stage 10 and a processing stage 12.

The conditioning stage 8 receives the signal provided by the antenna 6. In a known way, the conditioning stage 8 filters the received signal, changes the frequency of the received signal, amplifies the received signal and digitizes the received signal.

The receiving stage 10 comprises receiving channels, each receiving channel being associated with a respective satellite and able to detect the signal of the satellite. The receiving channels are similar. A single receiving channel 14, associated with a satellite 4 is illustrated in FIG. 1 and will be described in detail subsequently.

The receiving channel 14 comprises a carrier generator 16 for generating a local carrier forming a replica of the carrier of the satellite signal, a carrier oscillator 18 driving the carrier generator 16 and a carrier correlator 20 for correlating the received signal with the local carrier.

The receiving channel 14 comprises a code generator 22 for generating local codes forming a replica of the pseudo-random code of the satellite, a code oscillator 24 for driving the code generator 22 and a code correlation module 26 for correlating the received signal with the local codes.

The code generator 22 is able to generate a punctual local code P, advanced local codes E, each advanced local code E being advanced by a delay relatively to the punctual local code P, and delayed local codes L, each delayed local code L being delayed by a delay relatively to the punctual local code P.

The carrier oscillator 18 and the code oscillator 24 are Numerical Controlled Oscillators or "NCO".

The receiving channel 14 comprises an integrator 28 receiving the correlated signals and able to deliver corresponding integrated signals.

The receiving channel 14 has a carrier loop 30 for subordinating the carrier oscillator 18 so as to depend on the output of the integrator 28, so as to minimize a carrier error between the carrier of the satellite signal and the local carrier.

The carrier loop 30 comprises a carrier discriminator 32 connected to the output of the integrator 28 and able to determine a carrier error and to send to the carrier oscillator 18 a corresponding carrier correction signal. The carrier discriminator 32 receives the correlated received signal with the local carrier and with the punctual local code P.

The carrier error is a frequency or phase error for example due to the relative speed of the satellite and of the receiver 2 which modifies the apparent frequency or phase of the carrier of the satellite signal (Doppler effect).

The receiving channel 14 comprises a code loop 34 for subordinating the code oscillator 24 to the output of the integrator 38, so as to minimize a code error between the pseudo-random code of the satellite and the punctual local code P.

The code loop 34 comprises a code discriminator 36 connected to the output of the integrator 28 and adapted for determining code error depending on the result of the correlation produced between the received signal and the local codes, and for sending a corresponding correction signal to the code oscillator 24 for reducing the code error.

The code error corresponds to a time shift between the punctual local code P and the pseudo-random code of the satellite. The code loop 34 allows synchronization of the punctual local code P with the pseudo-random code of the satellite signal.

The receiving channel 14 provides at the output the local carrier and the punctual local code P to the processing stage 12 which uses them for extracting the data signal of the navigation message of the satellite by demodulation.

The code correlation module 26 is able to produce a combined correlation corresponding to a linear combination of a Double Delta correlation and of a narrow correlation.

The Double Delta correlation and the narrow correlation are each obtained by correlation of the received signal with an arithmetic combination of advanced E and delayed L local codes.

The combined correlation corresponds to the sum of a narrow correlation weighted with a weighting coefficient $\alpha$ and a Double Delta correlation weighted with a weighting coefficient $(1-\alpha)$. The weighting coefficient $\alpha$ is less than 1. The weighting coefficients are therefore positive and with a sum equal to 1.

The linear correlation is produced by calculation or by time partitioning between the Double Delta correlation and the narrow correlation.

Figure 2:
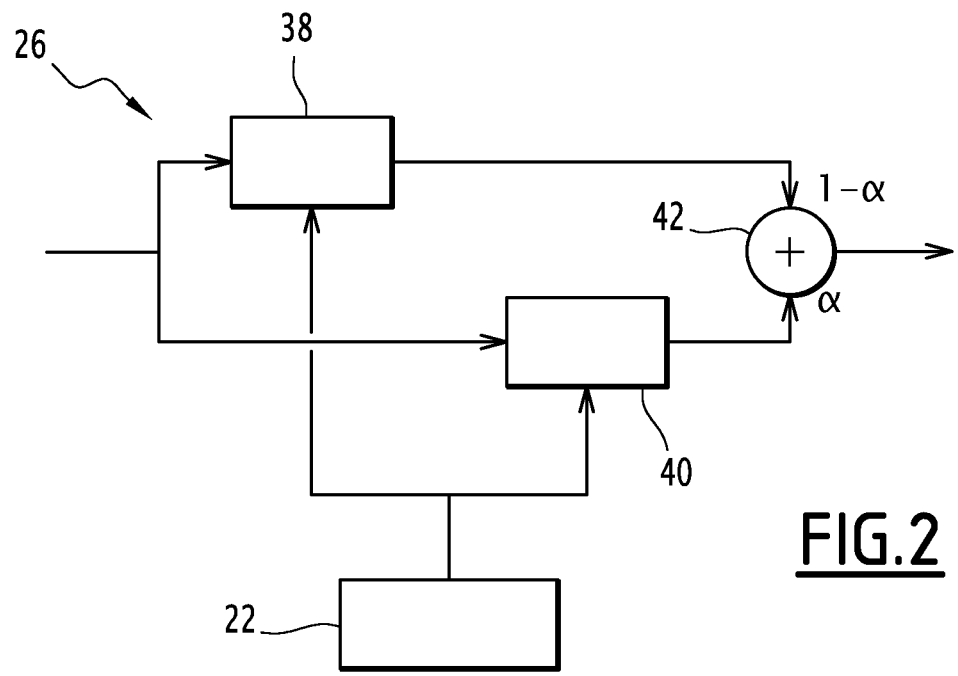
FIGS. 2 and 3 are functional diagrams of code correlation modules of the satellite navigation receiver.

The code correlation module 26 of FIG. 2 comprises a Double Delta correlator 38 for producing a Double Delta correlation between the received signal and the punctual local code, a narrow correlator 40 for producing a narrow correlation between the received signal and the punctual local code, and an adder 42 for adding both correlations weighted by their respective weighting coefficients.

The Double Delta correlator is designated by the expression "Double Delta Correlator" (DCC). The narrow correlator is designated by the expression "Narrow Correlator" (NC).

The Double Delta correlator 38 and the narrow correlator 40 each receive the advanced and delayed local codes generated by the code generator 22 and which are necessary to them.

The combined correlation is produced by individual correlation of each advanced or delayed local code with the received signal and then by combination of the results, or by combination of the advanced and delayed codes followed by correlation of the combinatorial code obtained with the received signal.

Figure 3:
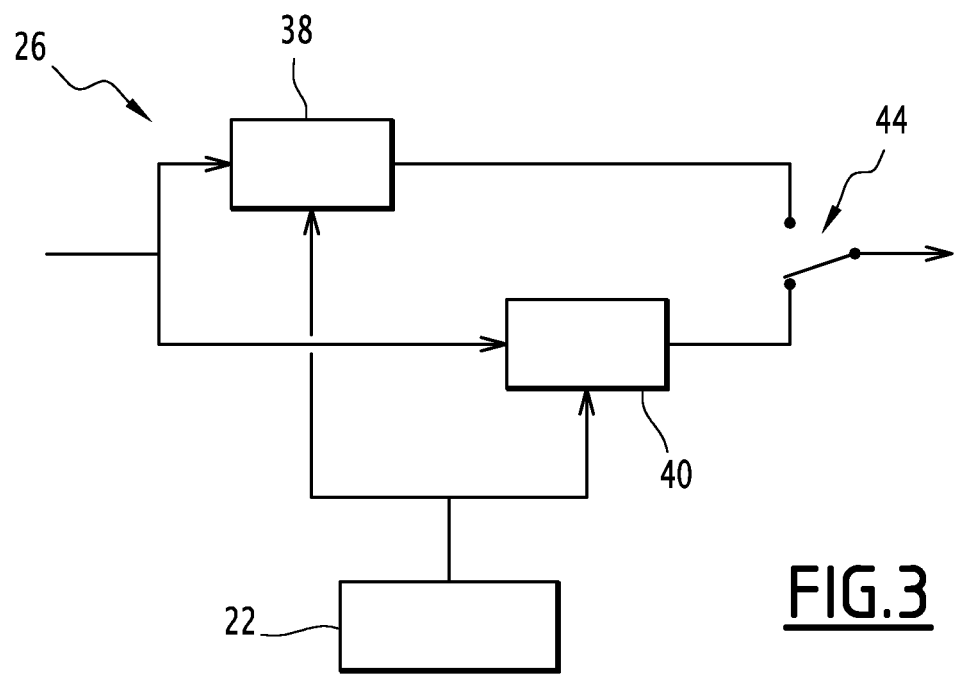

The code correlation module 26 of FIG. 3 differs from that of FIG. 2 in that the linear combination is not calculated but obtained by time partitioning between the Double Delta correlation and the narrow correlation.

The Double Delta correlation and the narrow correlation are cyclically alternated in time, the Double Delta correlation being produced on a first fraction of a time cycle and the narrow correlation being produced on a second fraction of the time cycle, the second fraction being complementary to the first fraction.

The code correlation module 26 of FIG. 3 differs from that of FIG. 2 in that the adder is replaced with a selector 44 adapted for selectively selecting the Double Delta correlator or the narrow correlator cyclically in time.

The selector 44 is controlled in order to select the Double Delta correlator on the first fraction of the time cycle and for selecting the narrow correlator on the second fraction of the time cycle, cyclically.

The integrator located downstream from the correlation multiplier comprises a lowpass filter. Consequently, the integrator produces an average over the time cycle and therefore produces the desired linear combination on the basis of the respective time period fractions allocated to the Double Delta correlation and to the narrow correlation.

A Double Delta correlation corresponds to a correlation of the received signal with an arithmetic combination of two advanced local codes E2, E1 and of two delayed local codes L1, L2 obtained by a time shift of the punctual local code P with delays −2d, −d, d and 2d, wherein d is a delay increment, and respectively assigned to coefficients 1, −2, +2 and −1, according to the relationship:

$$C_{DDC}=E2-2\cdot E1+2\cdot L1-L2$$

wherein

E2 is an advanced local code by a delay of 2d relatively to the punctual local code, E1 is an advanced local code by a delay of d relatively to the punctual local code, L1 is a delayed local code by a delay of d relatively to the punctual local code; and L2 is a delayed local code by a delay of 2d relatively to the punctual local code.

The delay increment d is less than ¼ chip.

A narrow correlation corresponds to a correlation of the received signal with an arithmetic combination of an advanced local code E3 and of a delayed local code L3 shifted relatively to the punctual local code P with delays −D and +D and respectively modified with a coefficient −1 and +1, according to the relationship:

$$C_{NC}=-E3+L3$$

wherein

E3 is an advanced local code by a delay D; and

L3 is a delayed local code by a delay D.

The delay increment D is less than 0.5 chip.

Preferably, the receiver 2 produces a combination of a Double Delta correlation and of a narrow correlation based on the same delay increment (D=d).

The narrow correlation is then written according to the relationship:

$$C_{NC}=-E1+L1$$

The combined correlation obtained by linear combination of the narrow correlation and of the Double Delta correlation then corresponds to a combination according to the following relationship:

$$C_{EDDC}=(1-\alpha)\cdot E2-(2+\alpha)\cdot L1-(1-\alpha)\cdot L2$$

Figure 4:
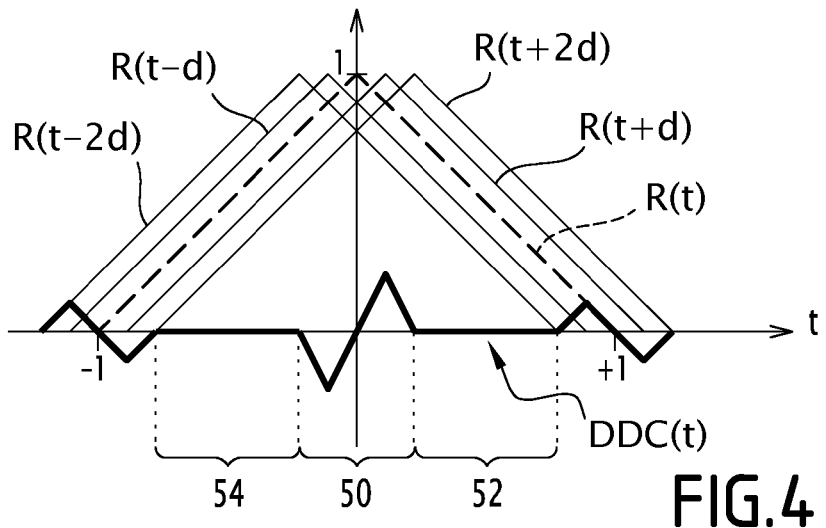
FIGS. 4, 5 and 6 are graphs illustrating correlation functions.
Figure 5:
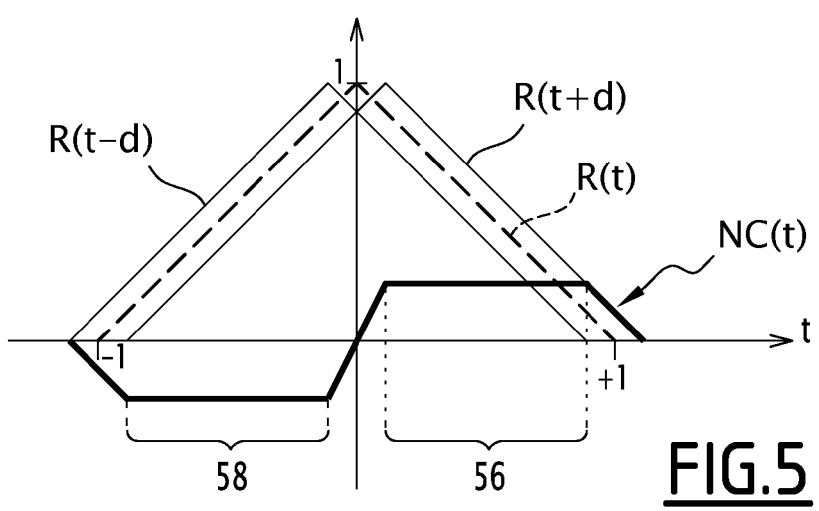
Figure 6:
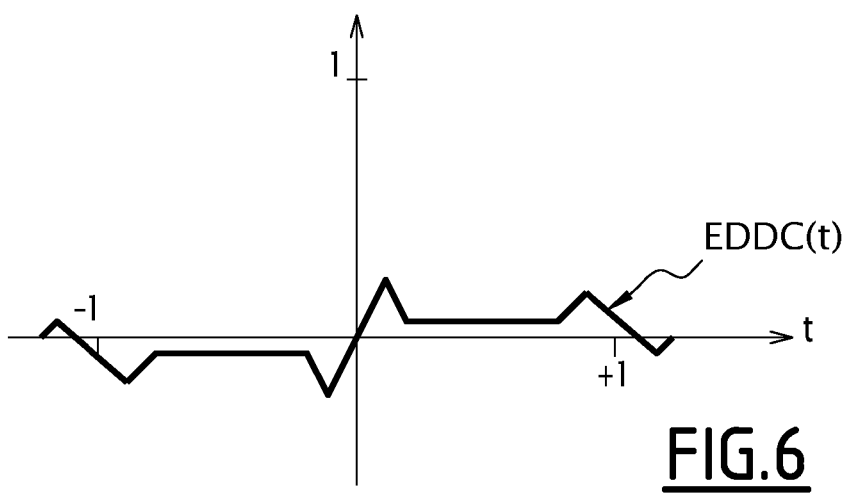

FIGS. 4 to 6 are graphs illustrating normalized correlation functions, and each representing the correlation coefficient (abscissa) depending on the code error (ordinate) expressed in "chip(s)".

FIG. 4 illustrates in solid lines the theoretical correlation function DDC(t) of a Double Delta correlator and in dotted lines the theoretical auto-correlation function R(t) of the pseudo-random code.

The pseudo-random code is designed so that its auto-correlation function R(t) is even and has a triangular shape on the interval [−1; +1].

The normalized correlation function of the Double Delta correlation DCC is expressed according to the following relationship:

$$DDC(t)=(R(t-2d)-2\cdot R(t-d)+2\cdot R(t+d)+R(t+2d))/R(t)$$

wherein t is the code error;

R is the auto-correlation function of the pseudo-random code;

d is the delay increment of the Double Delta correlation.

The correlation function of the Double Delta correlation has a capture area 50 on the interval [−2d; +2d] in which the correlation function is odd. The capture area is surrounded by two false lock-in areas 52, 54 on the intervals [−1+2d; −2d] and [2d; 1−2d], wherein the correlation function is zero.

FIG. 5 illustrates the correlation function of a narrow correlator NC.

The normalized correlation function of the narrow correlation NC is expressed, for a delay increment d, according to the following relationship:

$$NC(t)=(-R(t-d)+R(t+d))/R(t)$$

wherein

T is the code error;

R is the auto-correlation function of the pseudo-random code;

d is the delay increment.

The narrow correlation function NC is odd over the interval [−1−d; 1+d] and zero outside this interval. It has plateaus 56, 58 on the intervals [−1+d; 1−d] and [d; 1−d].

FIG. 6 illustrates the theoretical normalized correlation function of the combined correlation EDDC obtained by linear combination of the Double Delta correlation DCC and of the narrow correlation NC based on a time increment d, according to the relationship:

$$EDDC(t)=(1-\alpha)\cdot DDC(t)+\alpha\cdot NC(t)$$

As this is visible in FIGS. 4 to 6, the plateaus of the correlation function of the narrow correlation coincide with the false lock-in areas of the correlation function of the Double Delta correlation. The linear combination of the narrow correlation with the Double Delta correlation gives the possibility of widening the capture area of the Double Delta correlation function by suppressing the false lock-in areas.

In the case of a lock-in in the capture area of the Double Delta correlator, the measurement performances are unchanged and the immunity to multiple paths is degraded very little.

In the case of a lock in a false lock-in area of the Double Delta correlator, the code discriminator continues to provide an error correction signal to the code oscillator, which resorbs the code error slowly but certainly until it returns into the capture area of the Double Delta correlator.

Generally, the selection of the coefficient α depends:

on the bandwidth of the receiver which determines the defects of the actual correlation function of the Double Delta correlator, in particular the secondary areas;

on the desired reaction rapidity in the case of an initial code error located in a false lock-in area of the Double Delta correlator, and on the desired immunity to multiple paths, which decreases when the coefficient α increases.

The coefficient α is practically selected so as to be as small as possible while suppressing the secondary zeros of the false lock-in areas of the actual correlation function of the Double Delta correlator.

Preferably, the linear combination is produced by combining a larger fraction of the Double Delta correlator than the narrow correlator. The coefficient α is preferably less than 0.5.

The acquisition method is easily applied. In particular, a receiver designed for receiving a Double Delta correlation has a code generator able to generate the advanced E1 and delayed L1 local codes required for producing a narrow correlation based on the same delay increment. It may therefore be easily adapted for producing a linear combination of a Double Delta correlation and of a narrow correlation.

What is claimed is:

1. A method for acquiring a satellite signal emitted by a radio navigation satellite, the satellite signal containing a cyclic pseudo-random identification code specific to the satellite, the acquisition method comprising:
   generating a local code producing a replica of the identification code; and
   producing a combined correlation of a received signal with the local code, the combined correlation corresponding to a linear combination of a first double delta correlation and of a second narrow correlation;
   wherein the linear combination is obtained by alternating the first double delta correlation over a first fraction of a time cycle and the second narrow correlation over a second fraction of the time cycle complementary to the first fraction, in a cyclic manner.

2. The acquisition method as recited in claim 1 wherein the first double delta correlation is produced by correlation of the received signal with an arithmetic combination of two advanced local codes and of two delayed codes obtained by a time shift of the local code with delays of −2d, −d, d and 2d, wherein d is a delay increment, and respectively bearing the coefficient 1, −2, +2 and −1.

3. The acquisition method as recited in claim 2 wherein the second narrow correlation is based on the difference between an advanced code by a delay −D relatively to the local code and a delayed local code by the delay D relatively to the local code.

4. The acquisition method as recited in claim 3 wherein the increment delay d of the first double delta correlation is equal to the increment delay D of the second narrow correlation.

5. The acquisition method as recited in claim 1 wherein the linear combination is produced by assigning to the first double delta correlation and to the second narrow correlation positive coefficients (1-α; α) with a sum equal to 1.

6. The acquisition method as recited in claim 1 further comprising synchronizing the local code with the identification code so as to minimize a code error determined according to the result of the combined correlation.

7. The acquisition method as recited in claim 1 wherein the local code is generated by a code generator driven by a code oscillator subordinated by a code loop to the result of the combined correlation.

8. A satellite radio navigation receiver, for receiving a satellite signal, containing a cyclic pseudo-random identification code specific to the satellite, the receiver comprising:
   a code generator and a correlation module for applying an acquisition method as recited in claim 1.

9. A method for acquiring a satellite signal emitted by a radio navigation satellite, the satellite signal containing a cyclic pseudo-random identification code specific to the satellite, the acquisition method comprising:
   generating a local code producing a replica of the identification code; and
   producing a combined correlation of a received signal with the local code, the combined correlation corresponding to a linear combination of a first double delta correlation and of a second narrow correlation;
   wherein the linear combination is obtained by correlation and calculation from advanced and delayed local codes relatively to the local code.

10. The acquisition method as recited in claim 9 wherein the first double delta correlation is produced by correlation of the received signal with an arithmetic combination of two advanced local codes and of two delayed codes obtained by a time shift of the local code with delays of −2d, −d, d and 2d, wherein d is a delay increment, and respectively bearing the coefficient 1, −2, +2 and −1.

11. The acquisition method as recited in claim 10 wherein the second narrow correlation is based on the difference between an advanced code by a delay −D relatively to the local code and a delayed local code by the delay D relatively to the local code.

12. The acquisition method as recited in claim 11 wherein the increment delay d of the first double delta correlation is equal to the increment delay D of the second narrow correlation.

13. The acquisition method as recited in claim 9 wherein the linear combination is produced by assigning to the first double delta correlation and to the second narrow correlation positive coefficients (1-α; α) with a sum equal to 1.

14. A satellite radio navigation receiver, for receiving a satellite signal, containing a cyclic pseudo-random identification code specific to the satellite, the receiver comprising: a code generator and a correlation module for applying an acquisition method as recited in claim 9.

15. A method for acquiring a satellite signal emitted by a radio navigation satellite, the satellite signal containing a cyclic pseudo-random identification code specific to the satellite, the acquisition method comprising:
   generating a local code producing a replica of the identification code; and
   producing a combined correlation of a received signal with the local code, the combined correlation corresponding to a linear combination of a first double delta correlation and of a second narrow correlation;
   wherein the linear combination is produced by assigning to the first double delta correlation and to the second narrow correlation positive coefficients (1-α; α) with a sum equal to 1.

16. The acquisition method as recited in claim 15 wherein the first double delta correlation is produced by correlation of the received signal with an arithmetic combination of two advanced local codes and of two delayed codes obtained by a time shift of the local code with delays of −2d, −d, d and 2d, wherein d is a delay increment, and respectively bearing the coefficient 1, −2, +2 and −1.

17. The acquisition method as recited in claim 16 wherein the second narrow correlation is based on the difference between an advanced code by a delay −D relatively to the local code and a delayed local code by the delay D relatively to the local code.

18. The acquisition method as recited in claim 17 wherein the increment delay d of the first double delta correlation is equal to the increment delay D of the second narrow correlation.

19. The acquisition method as recited in claim 15 further comprising synchronizing the local code with the identification code so as to minimize a code error determined according to the result of the combined correlation.

20. A satellite radio navigation receiver, for receiving a satellite signal, containing a cyclic pseudo-random identification code specific to the satellite, the receiver comprising:
   a code generator and a correlation module for applying an acquisition method as recited in claim 15.

\* \* \* \* \*